United States Patent [19]

Minola

[11] Patent Number: 5,700,121

[45] Date of Patent: Dec. 23, 1997

[54] SELF-LOCKING NUT

[76] Inventor: Antonio Minola, Via Castello, 24 20040, Bellusco (MI), Italy

[21] Appl. No.: 689,246

[22] Filed: Aug. 7, 1996

[51] Int. Cl.$^6$ ............... F16B 37/08; F16B 37/16
[52] U.S. Cl. ............... 411/432; 411/433; 411/937.2
[58] Field of Search ............... 411/261, 324, 411/427, 432, 433, 437, 937.1, 937.2

[56] References Cited

U.S. PATENT DOCUMENTS

| | | | |
|---|---|---|---|
| 2,374,241 | 4/1945 | Simmonds | 411/432 X |
| 2,566,593 | 9/1951 | Bloomfield | 411/432 X |
| 3,233,262 | 2/1966 | Vollman | |
| 4,139,038 | 2/1979 | Haussermann | 411/427 X |
| 4,383,787 | 5/1983 | Reynolds | |
| 4,479,747 | 10/1984 | Pagel | 411/427 X |
| 4,930,962 | 6/1990 | Reynolds | 411/432 X |
| 5,049,017 | 9/1991 | Reynolds | 411/432 |

FOREIGN PATENT DOCUMENTS

| | | |
|---|---|---|
| 0 371 579 | 6/1990 | European Pat. Off. . |
| 0 443 670 | 8/1991 | European Pat. Off. . |
| 449 770 | 3/1913 | France . |
| 236806 | 7/1925 | United Kingdom . |
| 609234 | 9/1948 | United Kingdom . |

*Primary Examiner*—Neill R. Wilson
*Attorney, Agent, or Firm*—Young & Thompson

[57] ABSTRACT

The self-locking nut comprises an hexagonal outer case (10) having front and rear open faces, and a set of cup-shaped or tapered spring members (14a, 14b) having threaded bores (17) axially aligned with the front and rear openings of the case (10). At least one of the tapered spring members (14a) has side edges (18) inwardly rounded and is provided with deflection legs (19) which extend outwardly to engage the internal corners between the side walls (11) of the case (10). A braking washer (20) may be optionally provided inside the case (10) to prevent the reverse rotation of the nut caused external stresses; the braking washer (20) is provided with a large central hole (21) having inwardly extending protrusion (22) ending in correspondence of the average diameter of the thread (17) of the spring members (14a, 14b) of the nut.

12 Claims, 3 Drawing Sheets

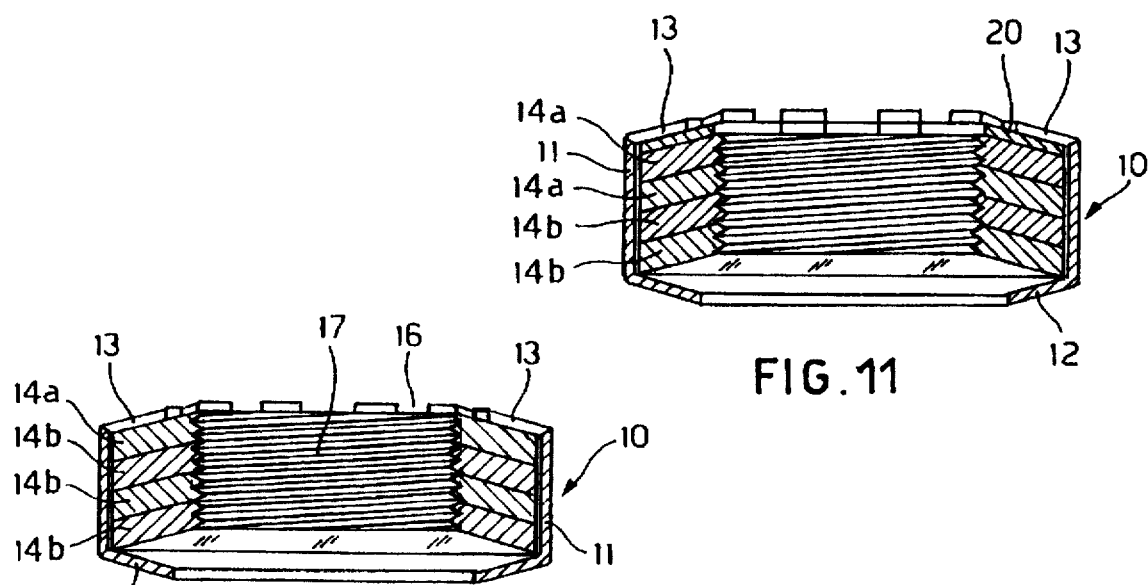
FIG. 11
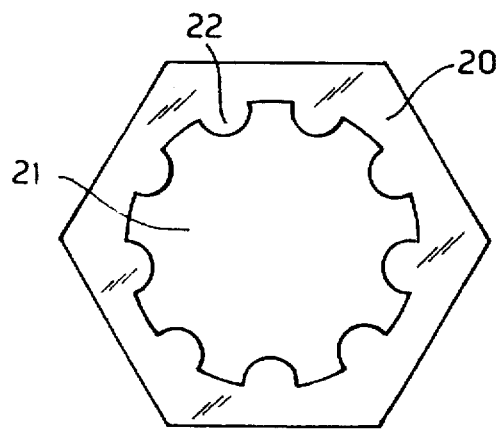
FIG. 12
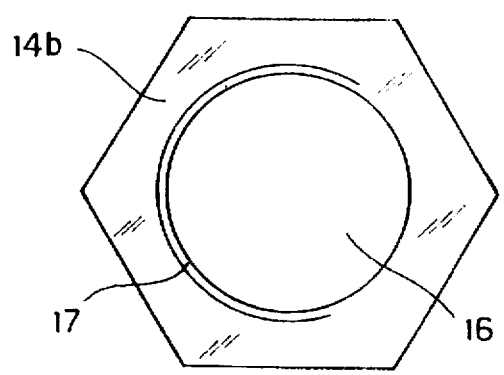
FIG. 9
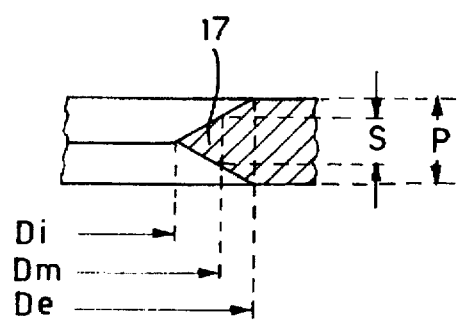
FIG. 10
FIG. 13

SELF-LOCKING NUT

BACKGROUND OF THE INVENTION

The present invention refers to a self-locking nut comprising a frontwardly and rearwardly open case having side walls peripherally arranged, and a front annular crown to provide for a bearing and axial load reduction surface; a set of cup-shaped or tapered spring members, each spring member having a threaded central hole, the spring member being stacked inside the case and being retained between the front crown and rear lugs which are inwardly bent to extend from the side wall edges.

PRIOR ART STATEMENT

Self-locking nuts of this type are widely known, and used as safety nuts, for example, in car the industry and for other applications. A self-locking nut of this type is, for example, described in U.S. Pat. No. 4,383,787.

Prior art self-locking nuts of the above mentioned type, lack a homogeneous distribution of the axial stresses between the various threaded members constituting the nut, in order to avoid an excessive stress concentration on some spring members, particularly on the first one which, in this way, could be damaged thus compromising safety and reliability of the self-locking nut.

SUMMARY OF THE INVENTION

The main object of the present invention is to provide for a self-locking nut of the above-mentioned type by means of which it is possible to obtain a uniform distribution of the axial stresses, preventing an excessive load concentration on the first turns next to the front bearing surface; in this way it is possible to obtain a high safety level and cheap construction of the nut.

A further object of the present invention is to provide for a self-locking nut as mentioned above by means of which it is possible to provide cup-shaped spring members having different load-deflection ratios by using particular configurations and/or arrangements of the spring members themselves inside the housing case. According to the invention, it is therefore possible to change or to adjust the tightening force irrespective of the height and/or diameter of the nut.

A further object of the present invention is to provide for a self-locking nut having braking means which cooperate in preventing a reverse rotation of the nut when subjected to external vibration or stresses.

These and other further objects of the inventions are obtained by a self-locking nut comprising an outer case having open front and rear sides, and peripherally arranged side walls, a set of tapered spring members having a threaded central bore, the spring members being stacked inside the case, and lugs means inwardly bent from the side walls to retain the spring members in the outer case, wherein at least one of the spring members comprises inwardly rounded peripheral edges and angularly spaced deflection legs, each of said legs radially protruding from the at least one spring member to engage a corresponding corner of the peripheral walls.

BRIEF DESCRIPTION OF THE DRAWINGS

Some embodiments of the self-locking nut according to the invention will hereinafter be described referring to the attached drawings, wherein:

FIG. 9 is a cross sectional view similar to the one in FIG. 4, for a second embodiment of the self-locking nut according to the invention;

FIG. 10 is a top view of a second type of the tapered spring members used together with the spring member of FIG. 7;

FIG. 11 is a cross-sectional view of a nut similar to the one of FIG. 9 which uses a self-braking member;

FIG. 12 is a top view of the self-braking member used in the self-locking nut of FIG. 11;

FIG. 13 is a schematic view illustrating the ratio between the thickness of the self-braking member of FIG. 12 and the thread pitch of the spring members.

DETAILED DESCRIPTION OF THE INVENTION

Figure 1:
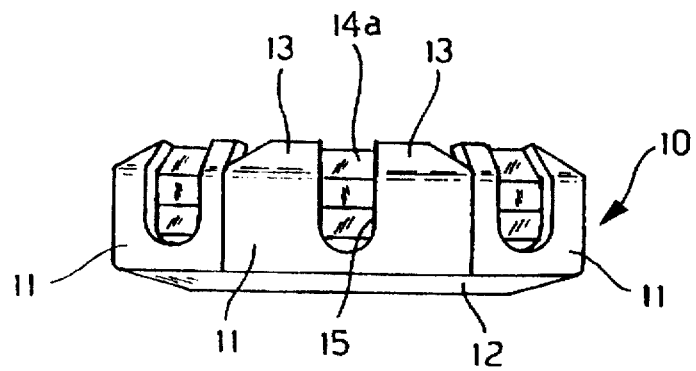
FIG. 1 is a front view of the self-locking nut.

With reference to FIGS. 1 to 8, a first embodiment of a self-locking nut according to the invention will be now described.

The self-locking nut substantially comprises an outer case 10, having hexagonal shape, peripherally delimited by side walls 11, by a front flange or crown 12 defining a load surface and by a plurality of rear lugs 13 inwardly bent to retain a plurality of cup-shaped or tapered spring members 14a superimposed or stacked inside the case 10.

Figure 2:
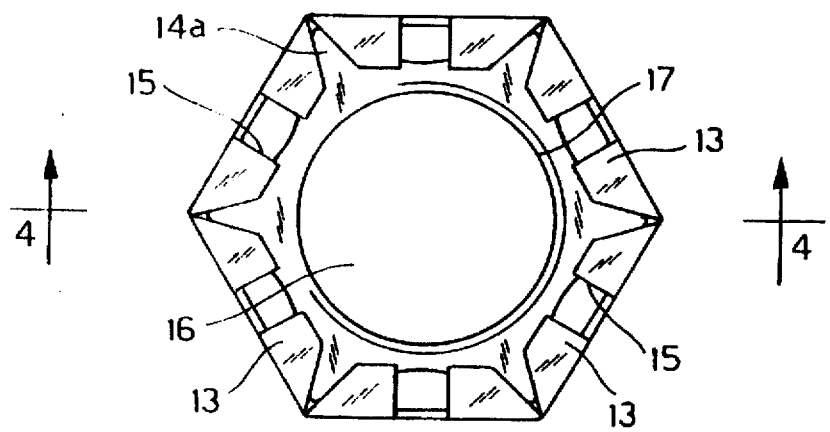
FIG. 2 is a top view of the self-locking nut of FIG. 1.
Figure 3:
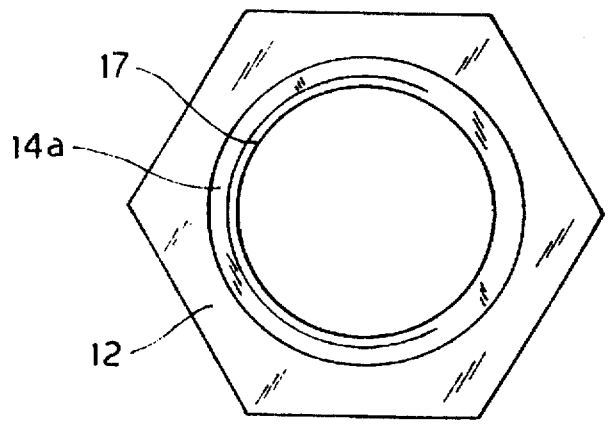
FIG. 3 is a bottom view of the self-locking nut of FIG. 1.
Figure 4:
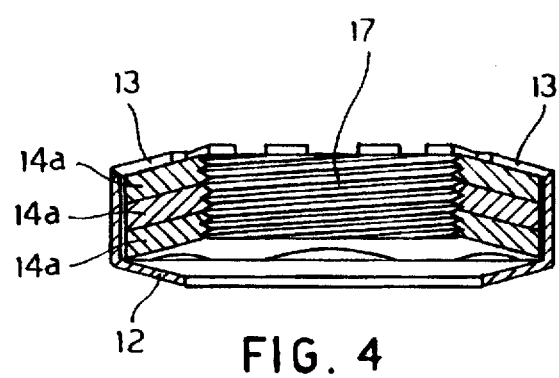
FIG. 4 is a cross-sectional view according to line 4—4 of FIG. 2.
Figure 5:
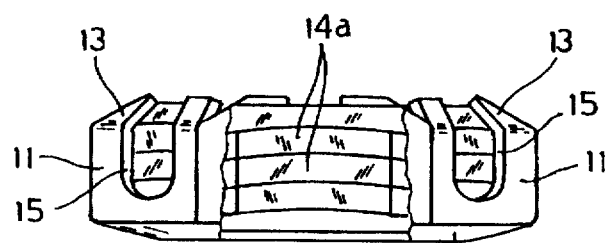
FIG. 5 is a view similar to the one of FIG. 1 with a side wall of the case partially removed to show the internal tapered spring members.
Figure 6:
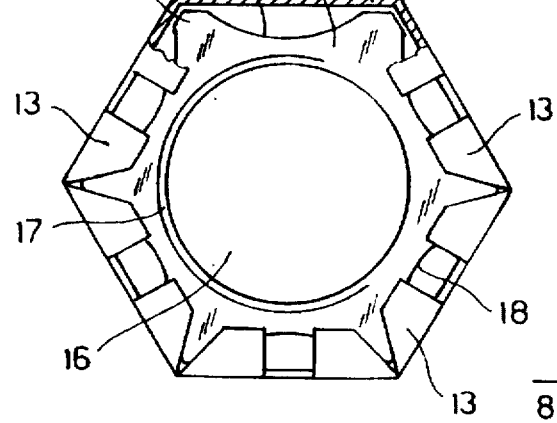
FIG. 6 is a view similar to the one of FIG. 2 where some lugs have been removed.

As can be seen in FIGS. 1 and 2, each side wall 11 of the case is provided with two rear lugs 13 suitably spaced one from another to define large slots 15 which, from lugs 13, longitudinally extend along a great part of walls 11, ending in correspondence of the front spring mender 14a; in this way the contemporaneous cooling of all spring members during the quenching treatment of the self-locking nut is obtained.

Each spring member 14a, as shown in various figures, has a central hole having a thread 17; the threaded bores of the superimposed spring members 14a are therefore axially aligned with the front and rear openings of the case 10 of the self-locking nut.

As previously referred, the case 10 presents a front tapered flange or annular crown 12 providing an elastically yielding rest surface for the nut converging in the opposite direction with respect to the taper of the spring members 14a inside the case 10; in this way the tapered flange or crown 12 when resting against a stop seat for the nut, at the beginning of the tightening will yield allowing a reduction of the axial forces acting on the threads.

Figure 7:
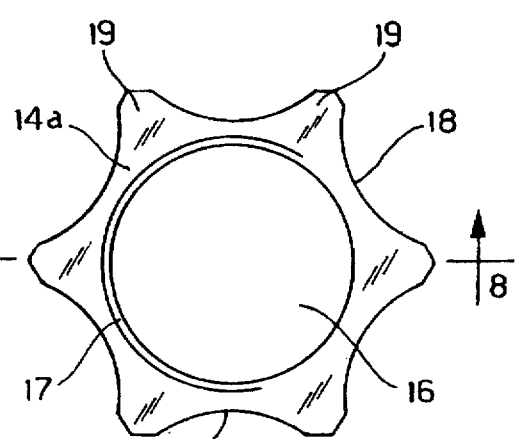
FIG. 7 is a top view of a first type of tapered spring members for the self-locking nut of FIG. 1.
Figure 8:
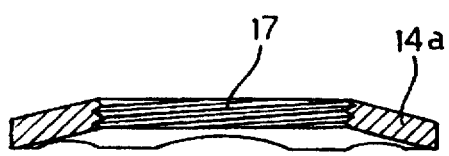
FIG. 8 is a cross-sectional view according to line 8—8 of FIG. 7.

As previously referred, in the example of FIGS. 1 to 4, all the spring members 14a of the nut have the same shape of FIGS. 7 and 8 and are provided with inwardly rounded edges 18 merging into radially protruding deflection legs 19 defining a star-like shape for the spring member 14a.

As will be apparent from FIG. 7, the bending radius of the outer curved edges 18 of the star-like spring member 14a, may be equal to, smaller or greater than the radius or diameter of the internal threaded bore of the spring member 14a. Also, the bending center of the rounded edges 18 may be differently positioned with respect to the axis of the nut. Doing so, that is, changing the curvature of the outer edges 18 and legs 19, changes the load-deflection ratio for the spring members 14a providing self-locking nuts having different tightening loads.

For example, in a same nut it is possible to use spring members 14a all having the same bending radius for the edges 18 and, consequently, the same deflection legs 19. However, it is also possible to provide, in a nut, star-shaped spring members having peripheral edges 18 with different bending radii and different configurations of the deflection legs 19, in order to allow a different distribution of the axial loads.

Other solutions are made possible by using, in combination with one or more star-shaped spring members 14a of FIG. 7, one or more spring members 14b having an hexagonal profile or linear edges of the type shown in FIG. 10.

An example of a self-locking nut which make use of a combination of star-shaped spring members 14a and spring members 14b having a hexagonal outline, is shown in FIG. 9 where the same reference numbers of the previous figures have been used to indicate similar or equivalent parts.

The self-locking nut of FIG. 9, as the one of FIG. 1, comprises therefore an outer case 10 provided with side walls 11, a front flange 12, a plurality of rear lugs 13 which block a set of spring members in which, the first three spring members 14b from the front face of the nut, have the same hexagonal outline corresponding to the spring member 14b of FIG. 10, while the fourth spring member 14a which is located in a rear position with respect to the previous ones, has a star-shaped configuration exactly like the one of FIG. 7.

Within the limits of the present invention other combinations as to the position and the number of spring members 14a and 14b are obviously possible, according to different requirements as to the design and use of the nut, maintaining the innovative principles of the invention.

In the previous cases, the self-locking nut comprises spring members 14a and/or 14b only, which, because of their elastic deflection, during screwing down of the nut, allow a self-locking action and an axial distribution of the stresses. However in some cases it could be helpful to use additional anti-screwing means, for example, a self-braking washer 20 as shown in FIG. 12, that during the screwing of the nut, partially interfere with the thread of the bolt or of the threaded stud on which the nut itself is screwed, in order to prevent a reverse rotation caused by anomalous stresses or vibrations that can take place during the use of the nut.

The use of a self-braking washer 20 is shown, for example, in FIGS. 11 to 14 of the attached drawings. In FIG. 11 is shown a self-locking nut 10 having a self-braking washer 20 positioned at the rear of the set of the spring members 14a, 14b of the previous example.

The self-braking washer 20 is provided by a flat member having an hexagonal outline as shown in FIG. 12.

The self-braking washer 20 comprises a central hole 21 having a greater diameter than the diameter of the threaded bores of the spring members 14a, 14b, and rounded protrusions 22 with different shape, which inwardly extend for a length sufficient to partially interfere with the thread of the bolt or of the threaded stud on which the nut has to be screwed. Preferably the protrusions 22 extend from the edge of the central hole 21, radially ending up to the average diameter Dm, FIG. 13, of the thread of the spring members 14a and/or 14b, in this way during screwing of the nut the rounded protrusion 22 are engaged with the crest of the thread of the bolt or stud on which the nut is screwed, thus producing and efficacious braking action, preventing the nut from unscrewing.

Beside providing a spot contact of the self-braking washer 20 with the thread of the bolt or of the stud on which the nut is to be screwed, it is advisable that the thickness of the self-braking washer 20 be lower than the thickness of the spring members 14a or 14b. Preferably, as shown in FIG. 13, the thickness of the self-braking washer 20 should be equal to or lower than the pitch P of the thread 17, in particular than the thickness S of the thread in correspondence with its average diameter Dm, in a point comprised between the internal diameter Di and the external diameter De.

The self-locking nut according to the invention may be assembled in the following way: after the shearing and shaping of the case 10 forming spring members 14a, 14b by a suitable die means starting from a flat sheet material in particular a band of spring steel, maintaining all the lugs 13 erect in a co-planar disposition with corresponding side walls 11; inserting therein all spring members 14a and/or 14b still without the thread; then partially inwardly bending the lugs 13 and threading is carried out contemporaneously all spring members thus prearranged in the same case; after that, according to the embodiment of FIG. 11, inserting in the case the self-braking washer 20; and then completely bending down the lugs 13 to close the outer case 10 on the spring members of the nut, which in this way is completed.

Figure 14:
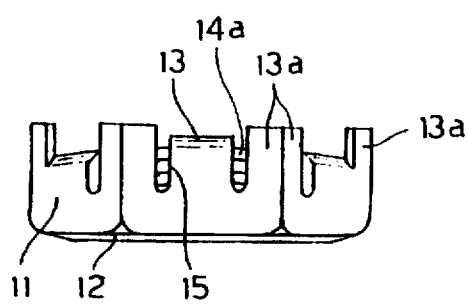
FIG. 14 is a front view of a further embodiment of the nut.

A further embodiment of the nut according to the invention is shown in FIG. 14 of the appended drawings. In the previous examples the case 10 of the nut comprises a lug 13 at each side of the peripheral walls, in which the lugs 13 at each corner of contiguous walls 11 are spaced by a triangular cut allowing the lugs 13 to be bent inwardly to retain the spring members 14a and/or 14b into the case 10 of the nut. Conversely in the example of FIG. 14, each wall 11 of the case 10 comprises a central lug 13 which may be bent to retain the spring members 14a and/or 14b, as well as side lugs 13a which extend in parallel to corresponding side walls, and in which the lugs 13 at each corner of the case are integral each other to extend the peripheral surface of the case 10 to engage the nut with a wrench tool. The solution of FIG. 14 is particularly suitable to be used for providing self-locking nuts with a reduced number of spring members 14a, 14b having a low value of the tightening force irrespective of the diameter for the same nut.

In light of the above said and the attached drawings, it will be understood that a self-locking nut has been provided which comprises an outer case preferably of an hexagonal shape, and a set of spring members which are cap-shaped or conically tapered, seated and blocked in the outer case in order to resiliently yielding during tightening, wherein the spring members preferably have all the same thickness and wherein at least one of the spring members has a characteristic star-configuration which, as explained above, allows for a uniform distribution of the axial stresses, by reducing the loads acting on the first one or on the first spring members of the nut, next to the front face. In this way it is obtained a self-locking nut having spring members suitable to gradually yield in an elastic way, thus assuring an efficacious anti-screwing and self-braking action as well as a uniform distribution of the axial loads for the entire height of the nut; moreover it provide for a greater reliability of the nut both in normal or unusual working conditions. The use of a self-braking washer, as described above, further improves the anti-screwing characteristics of the nut.

It is intended that what has been said or shown with reference to the attached drawings, has been given with an illustrative purpose only without limiting the general characteristics of the invention.

What is claimed is:

1. A self-locking nut comprising an outer case having open front and rear sides, and peripherally-arranged side walls, a set of tapered spring members, each having a threaded central bore, being stacked inside the case, and lugs inwardly bent from the side walls to retain the spring members in the outer case, wherein said set of spring members includes at least one first spring member comprising inwardly rounded peripheral edges and angularly spaced deflection legs, each of said legs radially protruding from each first spring member to engage a corresponding corner of the peripheral walls of the case.

2. A self-locking nut according to claim 1 wherein said spring members are identically-shaped, said case being hexagonal.

3. A self-locking nut according to claim 1 wherein, said set of tapered spring members comprises at least one second spring member having side edges parallel to the peripheral walls of the case said at least one second spring member being located at said open front side, said at least one first spring member being positioned to the rear of said at least one second spring member, between the at least one second spring member and said open rear side of the case.

4. A self-locking nut according to claim 1, wherein said set of tapered spring members further comprises hexagonal spring members, said hexagonal spring members having rectilinear edge portions matching the peripheral walls inside the case, said at least one first spring member arranged between said hexagonal spring members.

5. A self-locking nut according to claim 1 wherein the set of tapered spring members comprises differently shaped spring members having the same thickness and different load-deflection ratio.

6. A self-locking nut according to claim 1, wherein the case comprises a conical front face converging in an opposite direction to a taper of the set of tapered spring members inside the case.

7. A self-locking nut according to claim 1 wherein each of the peripheral walls of the case includes a slotted portion longitudinally extending along the wall.

8. A self-locking nut according to claim 1 comprising lugs members longitudinally extending and co-planary arranged to the side walls of the case.

9. A self-locking nut according to claim 1 comprising anti-rotational braking means inside the case, said braking means comprising a washer member having a central hole larger than a threaded bore of the spring members, and protrusions inwardly extending from the edge of the central hole to engage the threads of a bolt on which the nut is screwed.

10. A self-locking nut according to claim 9 wherein said washer member comprises a hexagonal outer edge engaging the side walls inside the case, said protrusions being round and angularly spaced.

11. A self-locking nut according to claim 10 wherein the washer member is made of a flat sheet material having a thickness smaller than the thickness of the tapered spring members inside the case.

12. A self-locking nut according to claim 11, wherein the washer member has a thickness of at most a thickness of an average diameter (Dm) of a thread in the threaded bore of the tapered spring members of the nut.

* * * * *